US006445907B1

United States Patent
Middeke et al.

(10) Patent No.: US 6,445,907 B1
(45) Date of Patent: Sep. 3, 2002

(54) METHOD AND SYSTEM FOR REMOTE DIAGNOSTICS OF A SATELLITE RECEIVER

(75) Inventors: Michael B. Middeke, Jefferson; Michael J. Scott, Ijamsville; Richard L. Armstrong, Gaithersburg; Jorge H. Guzman, Damascus, all of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/285,950

(22) Filed: Apr. 2, 1999

Related U.S. Application Data

(60) Provisional application No. 60/081,918, filed on Apr. 16, 1998.

(51) Int. Cl.[7] .............................................. H04B 17/00
(52) U.S. Cl. ................ 455/226.1; 455/12.1; 455/67.1
(58) Field of Search ....................... 455/3.02, 226.1, 455/12.1, 423, 424, 425, 427, 67.1; 348/563, 564

(56) References Cited

U.S. PATENT DOCUMENTS

| | | | |
|---|---|---|---|
| 5,579,367 A | * 11/1996 | Raymond et al. | 455/226.1 |
| 6,108,516 A | * 8/2000 | Kuether | 455/3.2 |
| 6,259,891 B1 | * 7/2001 | Allen | 455/3.02 |
| 6,295,646 B1 | * 9/2001 | Goldschmidt Iki et al. | 348/564 |

* cited by examiner

Primary Examiner—Nay Maung
(74) Attorney, Agent, or Firm—John T. Whelan; Michael W. Sales

(57) ABSTRACT

A method (120) and system (20) for reporting satellite receiver diagnostic information to a remote location is provided. A satellite receiver (24) includes an interface for receiving a service request for diagnostic information, a controller (69) for gathering the diagnostic information in response to the request, and a modem (66) for transferring the diagnostic information over a telephone network (32). This arrangement permits remote trouble-shooting by service technicians located at customer service centers.

27 Claims, 9 Drawing Sheets

METHOD AND SYSTEM FOR REMOTE DIAGNOSTICS OF A SATELLITE RECEIVER

This application claims the benefit of U.S. Provisional Application No. 60/081,918, filed Apr. 16, 1998.

TECHNICAL FIELD OF THE INVENTION

The present invention generally relates to satellite communication systems, and in particular, to the maintenance and servicing of satellite user terminals.

BACKGROUND OF THE INVENTION

Ground-based satellite receivers are becoming commonplace in consumer applications such as telecommunications and television broadcast. Typically, a satellite receiver includes a radio frequency (RF) receiver for communicating with a satellite, as well as additional components for providing services and features based on satellite communications.

An increasingly popular use of satellite receivers is direct television broadcast to consumers. Satellite technology has improved to the point where satellite receivers are affordable to large numbers of consumers, and thus, satellite television broadcast can effectively compete against cable broadcast in terms of cost and quality.

TV satellite receivers can be manufactured in many different form factors, including individual printed circuit cards. However, they are typically available to consumers as set top boxes that can be directly connected to conventional televisions. Additionally, commercially available set top boxes are also known to include modems that permit data communication over conventional telephone lines. These modem connections are typically used to report customer service histories to billing centers.

In addition to receiving satellite broadcasts, set top boxes are usually programmable. This permits end customers to configure their receivers according to their particular needs. For instance, a set top box can be programmed to receive specific television channels or to search listings for specific TV programs.

As is true with many programmable consumer devices, end customers often encounter difficulty in properly configuring their satellite receivers. In addition, subsystems within the satellite receiver can fail, also causing problems. When such difficulty is encountered, customers typically call into a customer service center. Service technicians at the center then walk the customers through a series of questions and/or steps in an attempt to resolve the problems. This can be a lengthy process, depending on the difficulty of the problem and the ability of the end customer to accurately describe the problem and follow instructions. Accordingly, the process would be more efficient if the service technicians could directly access the satellite receivers without relying on customer feedback. However, with conventional satellite receivers, such unfettered access requires physical possession of the receiver by the technician. This generally requires travel on the part of the technician or customer, adding considerable cost and inconvenience. Accordingly, there is a need for a method and system that permits service technicians to remotely diagnose problematic satellite receivers without having to rely on customer feedback.

SUMMARY OF THE INVENTION

The present invention provides a method and system for reporting satellite receiver diagnostic information to a remote location. According to one embodiment of the present invention, a satellite receiver includes a modem for reporting diagnostic information regarding the receiver's operation and settings via a telephone network. The satellite receiver can include an interface for receiving a request for diagnostic information, a controller for gathering the diagnostic information in response to the request, and a modem for transferring the diagnostic information over the telephone network. In addition, the modem interface can be used to receive commands, permitting service technicians to remotely re-configure the receiver.

This arrangement permits more effective trouble-shooting by service technicians located at a service center. By analyzing diagnostic information received directly from the receiver and remotely re-configuring the same, service technicians may be able to forego the lengthy process of walking end customers through a series of questions and/or steps in an attempt to resolve receiver problems.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings, in which:

DETAILED DESCRIPTION OF THE PREFERRED EMBODIMENT

Figure 1:
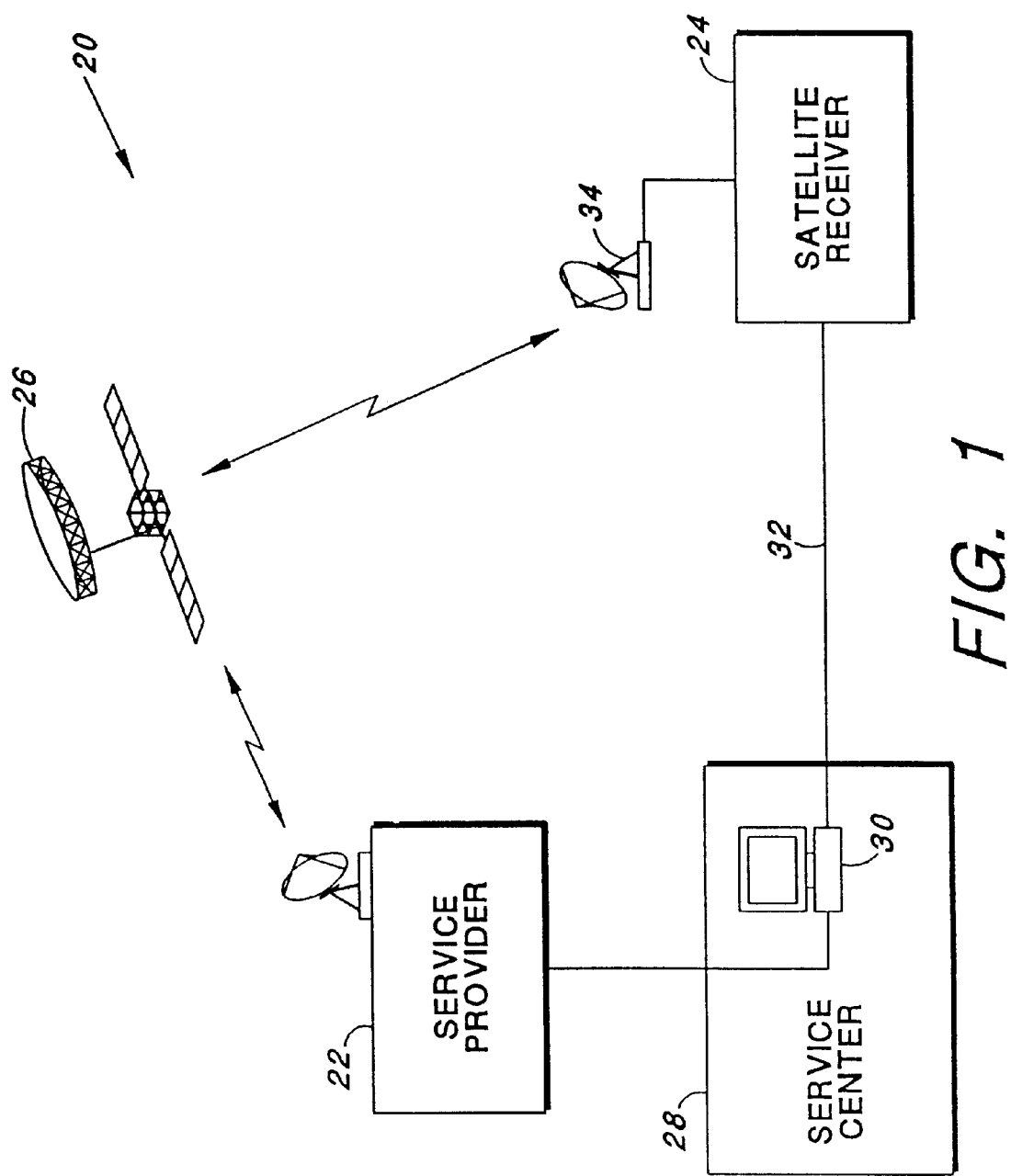
FIG. 1 is a conceptual diagram of a communication system in accordance with an embodiment of the present invention.

Turning now to the drawings, and in particular to FIG. 1, there is illustrated a communication system 20 in accordance with an embodiment of the present invention. The communication system 20 includes a service provider broadcast station 22, a satellite receiver 24, a communications satellite 26, and a service center 28. The service provider station 22 can broadcast data, such as video, voice, textual information, computer data, or the like, using conventional satellite communication techniques. The service provider station includes an up-link for transmitting broadcast information to the satellite 26 using a conventional satellite radio frequency (RF) link. Upon receiving the service provider's broadcasts, the satellite 26 re-transmits them using an RF down-link to one or more satellite receivers. The satellite 26 and satellite receiver 24 can communicate using any existing satellite transmission scheme, such as DBS, Ku-band, C-band services, or the like. An antenna 34 receives the RF signals from the satellite 26, providing them to the satellite receiver 24.

The satellite receiver 24 can communicate with the service center station 28 using a public service telephone network (PSTN) 32. A computer workstation 30 for analyzing diagnostic information is provided at the service center 28. The satellite receiver 24 and workstation 30 can communicate using conventional telephone modems (not shown). The workstation 30 can include software for displaying and analyzing the received information, and/or evaluating the operation of the satellite receiver 24.

A request for diagnostic information can be generated by a customer at the receiver 24. Alternatively, the workstation 30 can be used to generate the request. A request generated by the workstation 30 can be transmitted to the receiver 24 over the PSTN 32 using modems, or alternatively, using the satellite link. In the latter circumstance, the workstation 30 transmits a message containing the request to the service provider station 22. This message can be transferred to the service provider 22 using any conventional communication technique, including data communication over a local area network (LAN), modem, or the like; or voice communication between service technicians during a telephone conversation between the service provider 22 and the service center 28. In response to the service request, the service provider station 22 can generate a conditional access packet (CAP) which is transmitted via the RF link to the satellite 26, which in turn transmits the CAP to the satellite receiver 24. The CAP can be a data packet containing one or more digital commands for initiating the diagnostic process at the satellite receiver 24.

Upon receiving the service request, the satellite receiver 24 can access its internal diagnostic information, assemble it into a data format suitable for transmission to the service center workstation 30, and then transfer the assembled information over the PSTN 32 using a modem.

The diagnostic information obtained from the satellite receiver 24 can include customer preference settings, receiver configuration information, status information, operational information, or the like. Specifically, the reported diagnostic information can include, but is not limited to, the following:
1. Strength of Each Satellite Transponder (All polarizations and/or satellites)
2. Satellite Receiver Status (On/Off/Standby)
3. Modulator Bypass (On/Off)
4. Unactivated TV Channels
5. System Lock Status
6. Account Spending Limit, Viewer Rating Limit
7. Video Cassette Recorder (VCR) Infrared (IR) Remote Control Codes
8. Channel List Settings
9. Local Search Engine Settings
10. Graphical User Interface (GUI) Settings
11. Dealer and/or Service Provider Phone Numbers
12. Software Version Number
13. Front Panel Status
14. Smartcard Status
15. Scheduled Events Listing, including Viewer Tape Status, Channel Number, Start Time, Duration, Frequency
16. Pay Per View (PPV) Information, including Used Memory Slots, Unused Slots, Reported Slots, Expired Slots, Unreported Slots, Title, Time and Purchase Price of PPVs
17. Program Guide Filtering Status, including Theme Filter, Channel List Filter, Guide Times Filter, Class Filter
18. Unit ID
19. DRAM (Dynamic Random Access Memory) Status
20. V-SDRAM (Video Storage DRAM) Status
21. ROM (Read Only Memory) Checksum
22. Guide Descriptions (Enabled/Disabled)
23. Number of Mail. Messages (Read/Unread)
24. Card Chaining Status, including Valid Card, Expired Card, New Card
25. Customer Preference Settings, including Default Language, Menu, Color Phone Prefix, Screen Ratio, Multicolor Guide (On/Off)
26. Guide Filter Settings (Temporary/Persistent)

Figure 2:
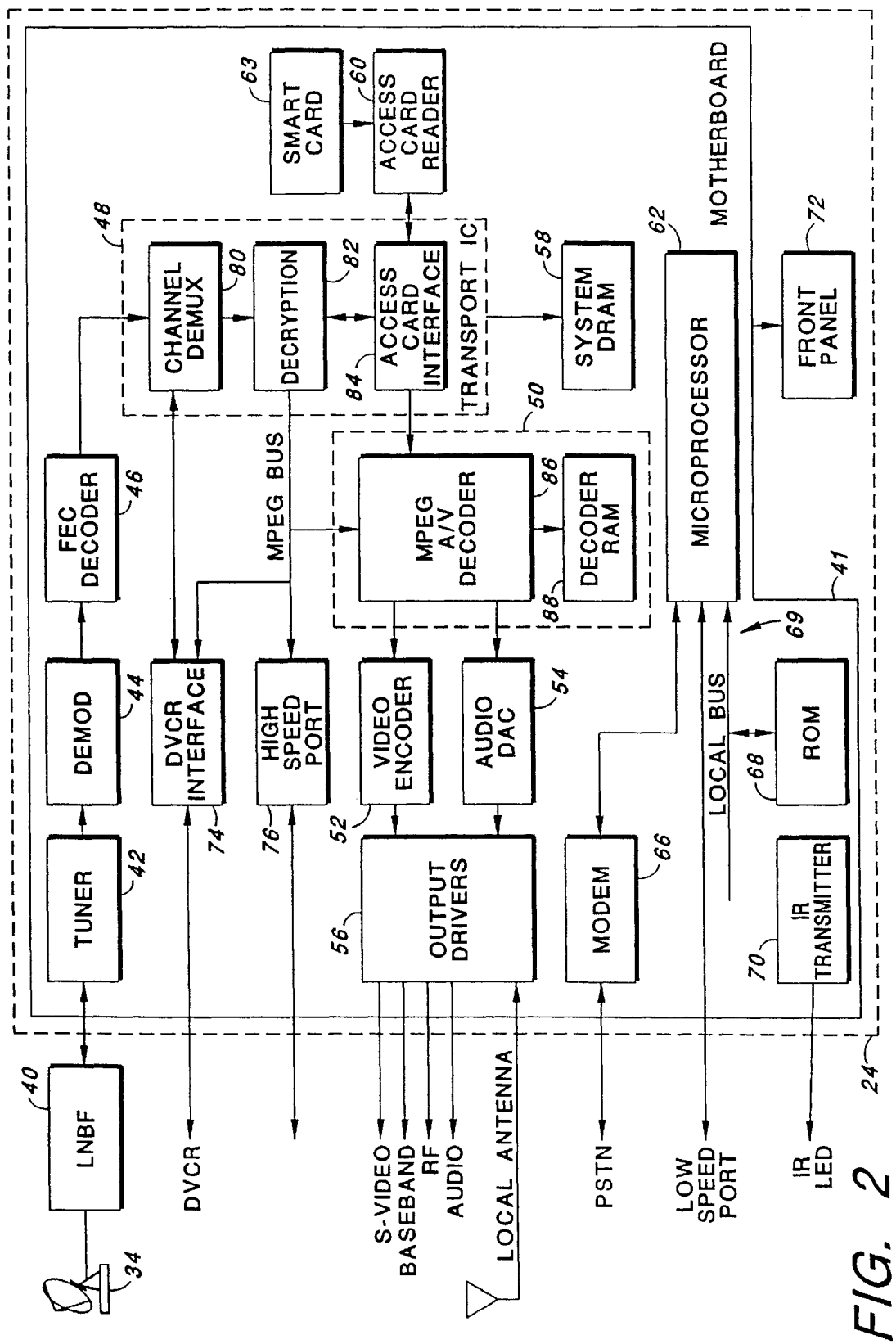
FIG. 2 is a block diagram illustrating an exemplary architecture of the satellite receiver of FIG. 1.

Turning now to FIG. 2, there is illustrated a detailed block diagram of the satellite receiver 24. The satellite receiver 24 can be connected to a conventional satellite dish antenna 34 using an LNBF 40. The antenna 34 and LNBF 40 can be included in a commercially available outdoor unit (ODU) compatible with the DIRECT TV System transmission scheme. In such an arrangement, the LNBF 40 can supply both left and right hand circular polarized satellite transmissions between 12.2 to 12.7 GHZ over a co-axial cable to the satellite receiver 24.

The satellite receiver 24 includes a tuner 42, a demodulator 44, a forward error correcting (FEC) decoder 46, a transport integrated circuit (IC) 48, an audio/video (A/V) subsystem 50, a video encoder 52, an audio digital-to-analog converter (DAC) 54, and output drivers 56. The receiver 24 also includes an access card reader 60, and optionally, a digital video cassette recorder (DVCR) interface 74, and a high speed port 76. A controller 69 comprising a microprocessor (uP) 62 and a read-only memory (ROM) 68 is included to control the operation of the receiver 24. Also included in the receiver 24 is a front panel 72 for permitting a user to manually enter commands, a modem 66 for providing data communication over the PSTN, and an optional infrared (IR) transmitter 70 for controlling external devices, such as VCRs, or the like.

Satellite receivers having hardware components and circuit arrangements different than those shown in FIGS. 2–3 and 5–11 can be used to achieve the receiver of the present invention. Accordingly, the receiver 24 and its subcomponents described herein are provided as examples. The present invention is not limited to the configuration or the specific operational characteristics of the receiver 24 or the subcomponents shown in FIGS. 2–3 and 5–11.

Two exemplary operational scenarios are now described to illustrate the diagnostic information reporting feature of the satellite receiver 24. In the first scenario, a diagnostic report is initiated by the customer first contacting the technical service center. The technical service center then contacts the service provider to request that the provider send a special conditional access packet (CAP) that, when received by the satellite receiver 24, would initiate the diagnostics gathering process therein and then cause the satellite receiver 24 to transfer the diagnostics information to the technical service center via the modem 66. The special CAP can be received at the antenna 34 and transmitted to the satellite receiver 24, via the LNBF 40.

In the second scenario, the end customer initiates the diagnostic reporting process by either entering a special sequence of keys, or by selecting a button on the front panel 72 that would initiate the reporting process. Alternatively, a graphical user interface (GUI) software routine could be added to the operating system of the controller. The software routine could direct the receiver 24 to generate a GUI screen on a TV connected to the receiver 24. Such a GUI screen would permit a user to initiate the reporting process by selecting a software button displayed on the television screen. Also, a second GUI screen could be generated in the software for showing the progress and whether the diagnostic information was successfully reported to the technical service center. Upon user initiation, the satellite receiver 24 would gather internal diagnostic information and then transfer it to the technical service center via the modem 66. An advantage of the second operational scenario is that no interaction is required with the service provider. Another advantage is that the diagnostic information can be made available, even if the satellite signal is not being received.

The modem 66 can be a commercially-available conventional modem having a Bell 212 compliant interface. The modem can operate at any baud rate, such as 1.2 k baud, can include dual-tone multi-frequency (DTMF) tone generation, call progress tone detection, pulse dialing capability, automatic DTMF detection, on-hook/off-hook switch capability, and the like.

Microprocessor 62 can be programmed to control the modem 66. Specifically, the microprocessor 62 can support call initiation, as well as process data transfers to and from the modem 66. The modem 66 and the microprocessor 62 can communicate using a conventional universal asynchronous receiver/transmitter (UART) interface.

Figure 3:
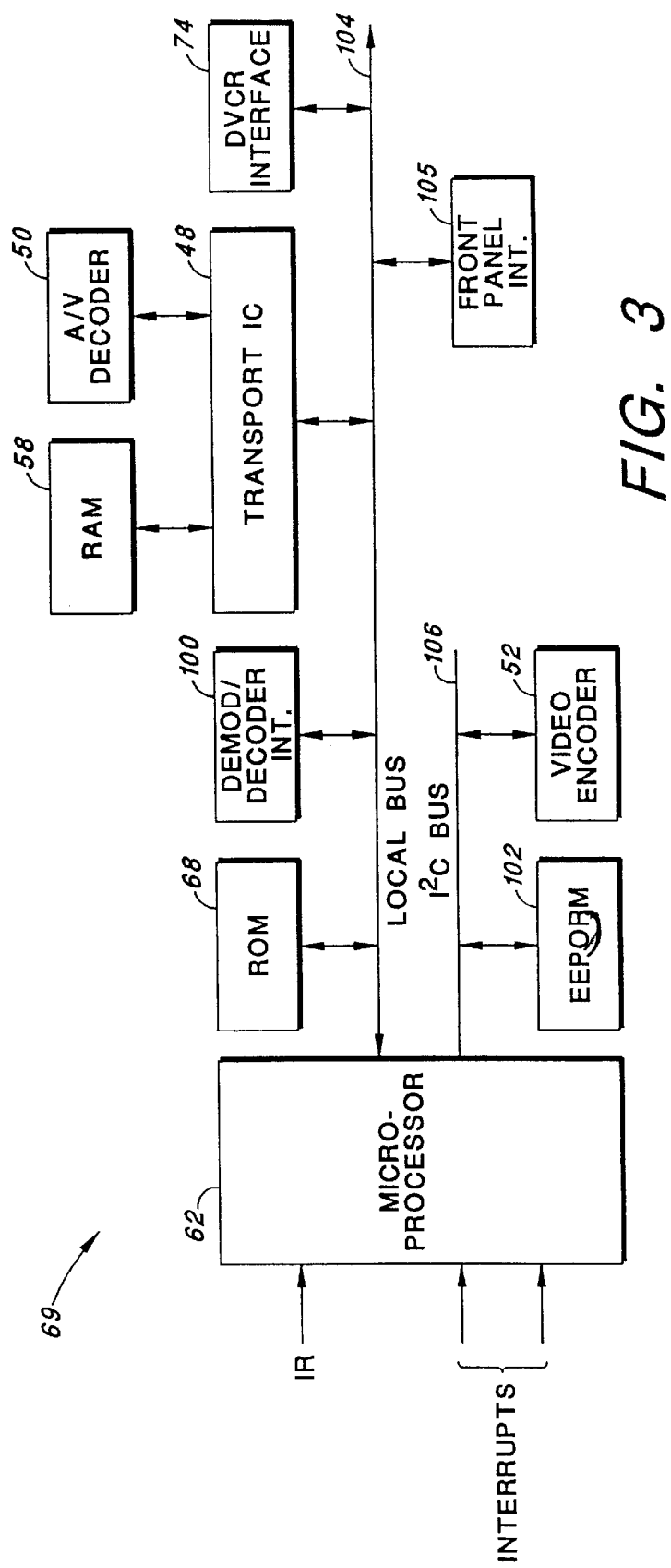
FIG. 3 is a block diagram of the controller architecture included in the satellite receiver of FIG. 2.

FIG. 3 illustrates the details of the controller 69 used in the satellite receiver shown in FIG. 2. The microprocessor 62 acts as a central controller for the satellite receiver 24, and can be implemented using a commercially available microprocessor, such as an AMD188ES, or AMD186ES available from Advanced Micro Devices, Inc.; or any other suitable microprocessor or microcontroller manufactured by either Motorola, Inc. or Intel Corporation, or their equivalents. Software programs executable by the microprocessor 62 can be stored in the ROM 68 or system random access memory (RAM) 58.

The microprocessor 62 can communicate with various components in the satellite receiver 24 via two buses. The local bus 104 can be a standard 8-bit parallel bus that interfaces the microprocessor 62 to the demodulator/FEC decoder interface 100, the transport IC 48, a front panel interface 105, and the DVCR interface 74. The second bus 106 can be an I²C bus, which communicates with serial peripherals, such as an electrically-erasable programmable read only memory (EEPROM) 102 and the video encoder 52. I²C bus components and protocol definitions are available from Phillips Corp.

The EEPROM 102 can store information such as the satellite receiver model number, manufacturing related information, such as version numbers, or the like.

The microprocessor 62 can monitor and control the video encoder 52 via the bus 106. For instance, closed captioning information can be provided to the, video encoder 52 via the bus 106.

It will be apparent to one of ordinary skill in the art that the controller architecture of FIG. 3 is exemplary, and that the controller itself can be equivalently implemented using different digital components and bus structures than those shown.

Figure 4:
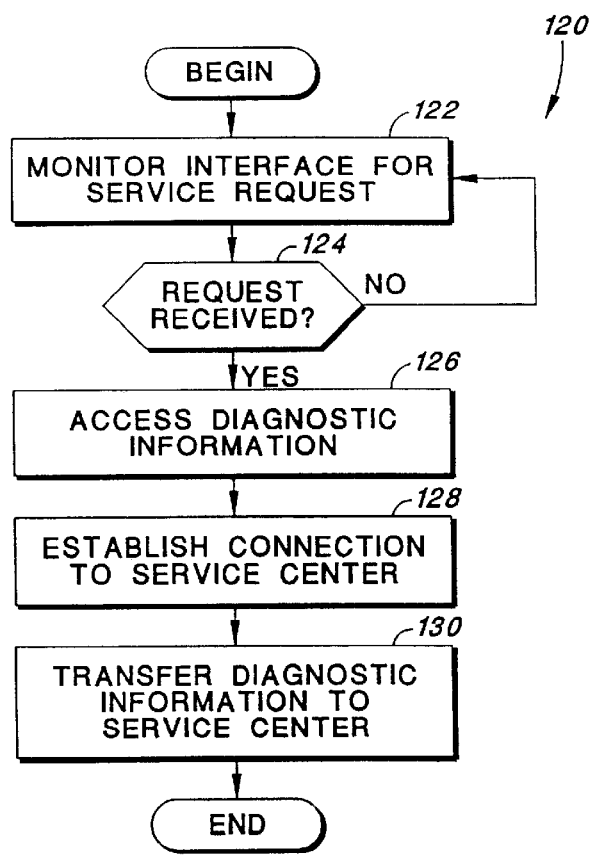
FIG. 4 is a flowchart diagram illustrating an operation of the controller of FIG. 3 in accordance with an embodiment of the present invention.

FIG. 4 is a flowchart diagram illustrating a method 120 of operating the controller of FIG. 3 in accordance with one embodiment of the present invention. The method 120 can be implemented using instructions included in a software program executable by the microprocessor 62 and storable in either the ROM 68 or RAM 58, or other storage mediums, such as flash memory or a hard disk drive (HDD) (not shown).

In step 122, the microprocessor 62 monitors an interface to determine whether a service request has been received. The interface can be any means permitting the reception of a service request by the receiver 24. In the exemplary satellite receiver 24 of FIG. 2, the interface can include the front panel 72, which permits user-initiated requests, or alternatively, the satellite RF link via the antenna 34, which permits service center initiated requests. The front panel 72 can be monitored by polling the front panel interface 105 over the local bus 104 to determine whether a service request has been entered. The RF interface can be monitored via the transport IC 48. As will be discussed below, the transport IC 48 can provide incoming message packets to the microprocessor 62 via the local bus 104. These messages can include the special CAP containing the service request for diagnostic information.

The microprocessor 62 can continuously monitor the interface until it detects a service request (step 124). Upon receiving a request, the microprocessor 62 begins the process of gathering diagnostic information (step 126). The diagnostic information can include those items listed above herein. The microprocessor 62 can gather the information by accessing various components within the satellite receiver 24 via the buses 104, 106. The information can be accessed by sending predetermined control codes over the buses to each component interface or device. In response to these control codes, the components can transfer diagnostic data to the microprocessor 62, which in turn, can store such data in the system RAM 58.

After gathering the diagnostic information, the microprocessor can establish a connection to the service center via the modem 66 (step 128). The microprocessor 62 can accomplish this by executing a predetermined software routine for initializing and controlling the modem 66.

Upon successfully establishing a modem connection to the service center, the microprocessor 62 can begin the transfer of diagnostic information to the service center via the PSTN (step 130). To accomplish this, the microprocessor 62 can execute a software routine for transferring the diagnostic information from the system RAM 58 to the modem 66. After the transfer is complete, the microprocessor 62 can cause the modem 66 to disconnect from the service center.

Figure 5:
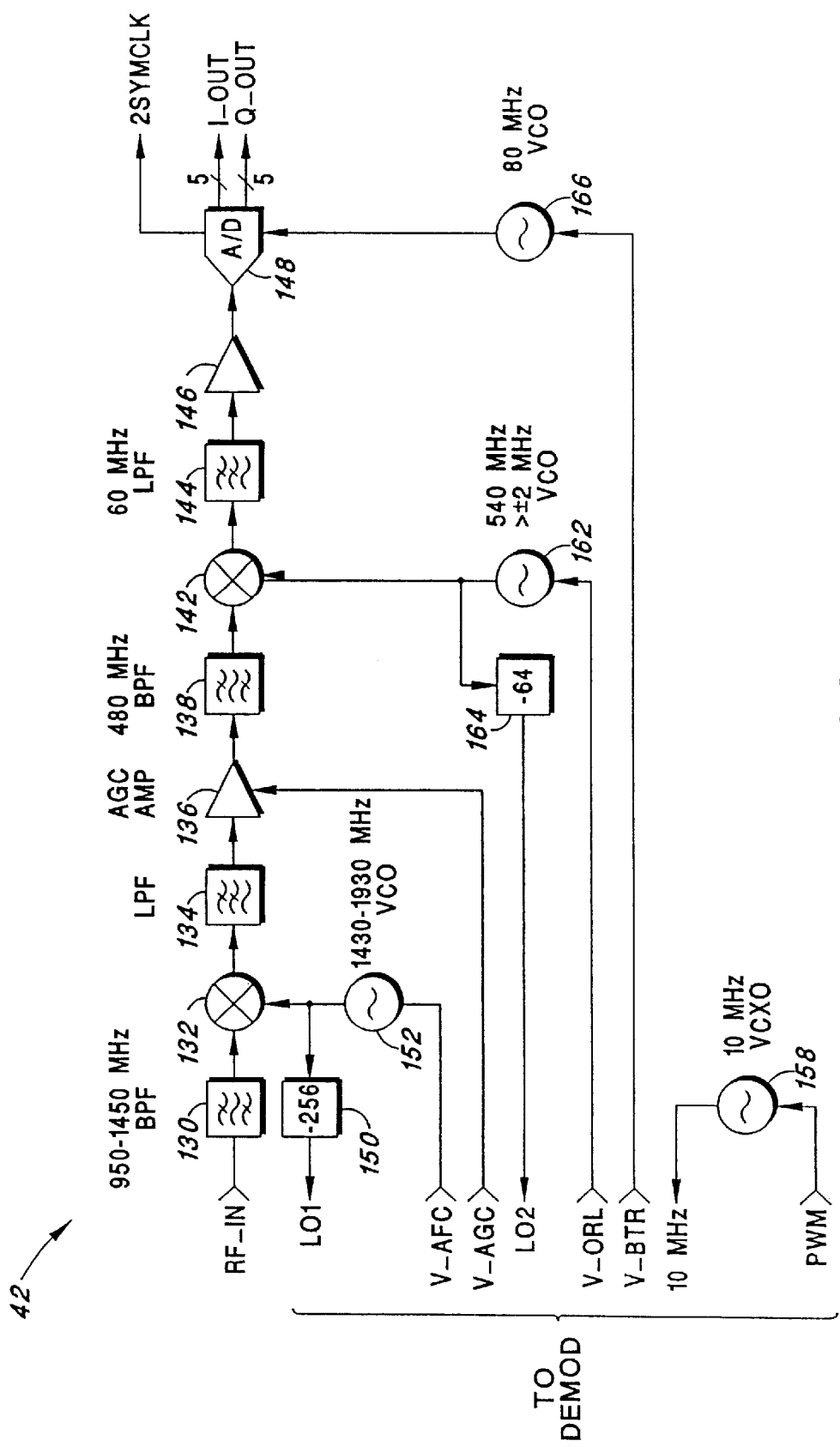
FIG. 5 is a detailed block diagram of the tuner shown in FIG. 2.

Turning now to the other components included in the receiver 24, FIG. 5 is a detailed block diagram of the exemplary tuner 42 shown in FIG. 2. The tuner can tune to any of 32 satellite transponders within the 500 MHz band transmitted by the LNB between 950–1450 MHz. The tuner 42 can down convert incoming RF signals from a selected transponder to a 60 MHz intermediate frequency (IF), and perform A/D conversion at 80 megasamples/second. In addition, the tuner 42 can support automatic frequency control (AFC), automatic gain control (AGC), and carrier recovery loop (CRL) functions.

The exemplary tuner 42 is essentially a dual-conversion digital receiver that operates in conjunction with the demodulator 44 to create AFC, AGC, and CLR loops. The tuner 42 provides channel selection under the control of the microprocessor 62.

An input RF signal (RF_N) is first filtered by a bandpass filter (BPF) 130, and then is mixed down by a mixer 132 and a first local oscillator (LO) 152, which has a range of 1430–1930 MHz. The resultant output is at an IF signal of 480 MHz. The first LO 152 can be a voltage controlled oscillator (VCO) that is controlled by the demodulator 44. The output of the first LO 152 can be divided by 256 and returned to the demodulator 44 as part of the AFC loop (LO1).

The 480 MHz IF is passed through a low pass filter (LPF) 134 and a gain stage 136, which provides the AGC function under control of the demodulator 44. The output of the gain stage is then bandpass filtered by a BPF 138 at 480 MHz and presented to a second mixing stage. The second mixing stage includes a mixer 142 driven by a 540 MHz VCO 162 with a tuning range of +/−100 kHz, and is controlled by the demodulator 44 as part of the CRL (V_CRL). The output of the mixer 142 is a second IF signal of 60 MHz. The output of the VCO 162 is also divided by 64 and returned to the demodulator 44 as part of the CRL (LO2).

The second IF signal is low pass filtered by filter 144, amplified by amplifier 146, and presented to an A/D converter 148 for sub-sampling at 80 MHz. The output of the A/D converter 148 can be two 6-bit digital signals, (I_OUT, Q_OUT) representing the I and Q channels which are sent to the demodulator 44. The A/D converter 148 can also generate a system clock (2SYMCLK), which is used by various components within the receiver 24. The system clock signal can be generated based on the 80 MHz output of the VCO 162. The VCO (166) can be controlled as part of a bit timing recovery (BTR) loop using feedback from the demodulator 44 (V_BTR).

The 80 MHz VCO 166 can be phase-locked to a 10 MHz VCO 158, for bit timing recovery.

Figure 6:
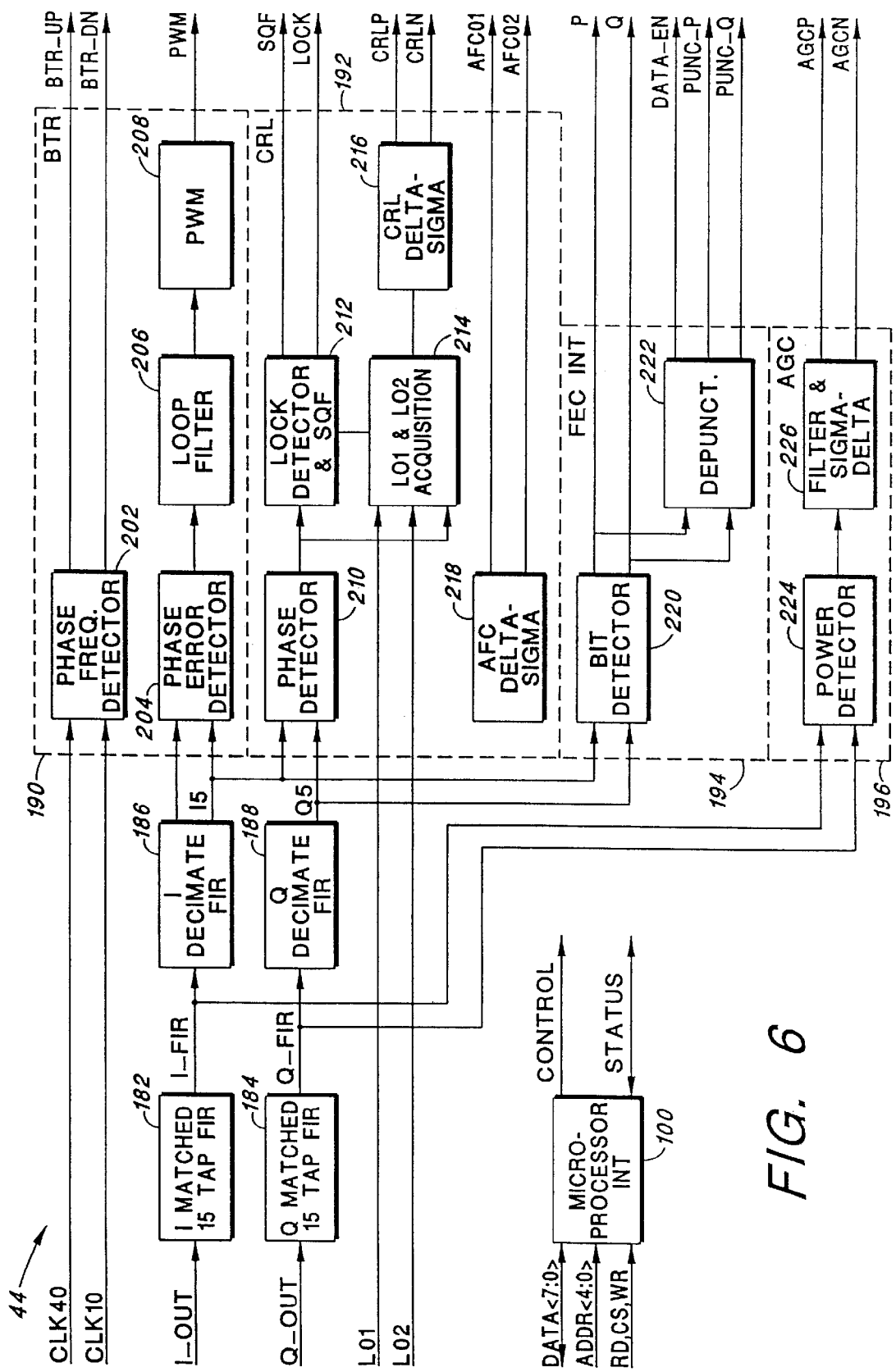
FIG. 6 is a detailed block diagram of the demodulator shown in FIG. 2.

FIG. 6 is a detailed block diagram of the demodulator 44. The demodulator 44 performs the following functions based on signals received from the tuner 42; digital filtering of the I and Q channel data (I_OUT, Q OUT) received from the tuner 42; power level detection and filtering, generation of differential output to provide AGC functionality; quadature phase shift key (QPSK) and binary phase shift key (BPSK) carrier phase detection for use in the CRL; signal quality factor (SQF) estimation for use in antenna pointing, as well as estimating incoming carrier-to-noise ratio; symbol timing recovery and generation of a pulse width modulation (PWM) output for use in the BTR loop; 3-bit soft decision output with selectable slicing threshold; depuncturing for either a R2/3 or R6/7 Viterbi decoder; frequency estimation for the first and second LOs 152, 162 in the tuner 42; and bit error rate (BER) testing and bit error information provision to the microprocessor 62.

The demodulator 44 includes a BTR circuit 190, a CRL circuit 192, an FEC interface 194, and an automatic gain control (AGC) circuit 196. The microprocessor interface 100 permits the microprocessor 62 to issue commands to the demodulator 44 over the control line and monitor the status of the demodulator 44 using the status line. As shown in the example, the microprocessor interface 100 can be coupled to the local bus 104 using an 8-bit data bus, 5-bit address bus (ADDR) and control signals, such as read enable (RD), write enable (WR), and chip select (CS).

Digital filtering of the I-channel is performed by a matched finite impulse response (FIR) filter 182 and decimation FIR filter 186; while digital filtering in the Q channel is performed by a matched FIR filter 184 and decimation FIR filter 188.

Simple timing recovery and pulse width modulation (PWM) output is generated by the BTR circuit 190. The BRT circuit 190 includes a phase/frequency detector 202 for generating output signals DTR_UP, BRT_DOWN, which are used to control the VCO 166 of the tuner. The PWM output is generated from the filtered I-channel input. To generate the PWM output, the filtered I-channel signal is provided to a phase error detector 204. The output of the phase error detector 204 is then filtered by a loop filter 206. The output of the filter 206 is then provided to a pulse width modulator circuit 208, which in turn generates the PWM output. The PWM output is provided to the VCO 158 of the tuner to generate the 10 MHz clock signal.

The CRL-circuit 192 includes circuits-for generating a signal quality factor (SQF) estimation signal, as well as circuits for generating an AFC output (AFCD1, AFCD2). The SQF and lock outputs are generated from the filtered I-channel and Q-channel inputs. A phase detector 210 receives the filtered I and Q channels. The output of the phase detector is provided to a lock detection and SQF circuit 212, which generates the SQF output and lock signal. The lock signal indicates that the carrier has been acquired by the receiver 24. CRL outputs (CRLP, CRLN) are generated from the local oscillator signals (LO1, LO2) generated by the tuner circuit 42. An acquisition circuit 214 receives the LO1, LO2 signals, as well as the output of the phase detector 210. The acquisition circuit 214 provides its output to a CRL delta sigma filter 216, which in turn generates the CRL outputs. The CRL outputs are used to control the VCO 162, while the AFC output signals are used to control the VCO 152 of the tuner circuit 42. The FEC interface 194 includes a bit detector and a depunctuation circuit 222. In response to the filtered I-channel and Q-channel inputs, the FEC interface 194 generates two 4-bit data outputs, as well as a data enable signal (DATA_EN) and punctuation signals (PUNC_P, PUNC_Q).

The AGC circuit 196 generates AGC outputs (AGCP, AGCN), which are provided to the AGC amp 136 of the tuner 42. The AGC circuit 196 includes a power detector 224 and a filter and sigma-delta circuit 226.

Figure 7:
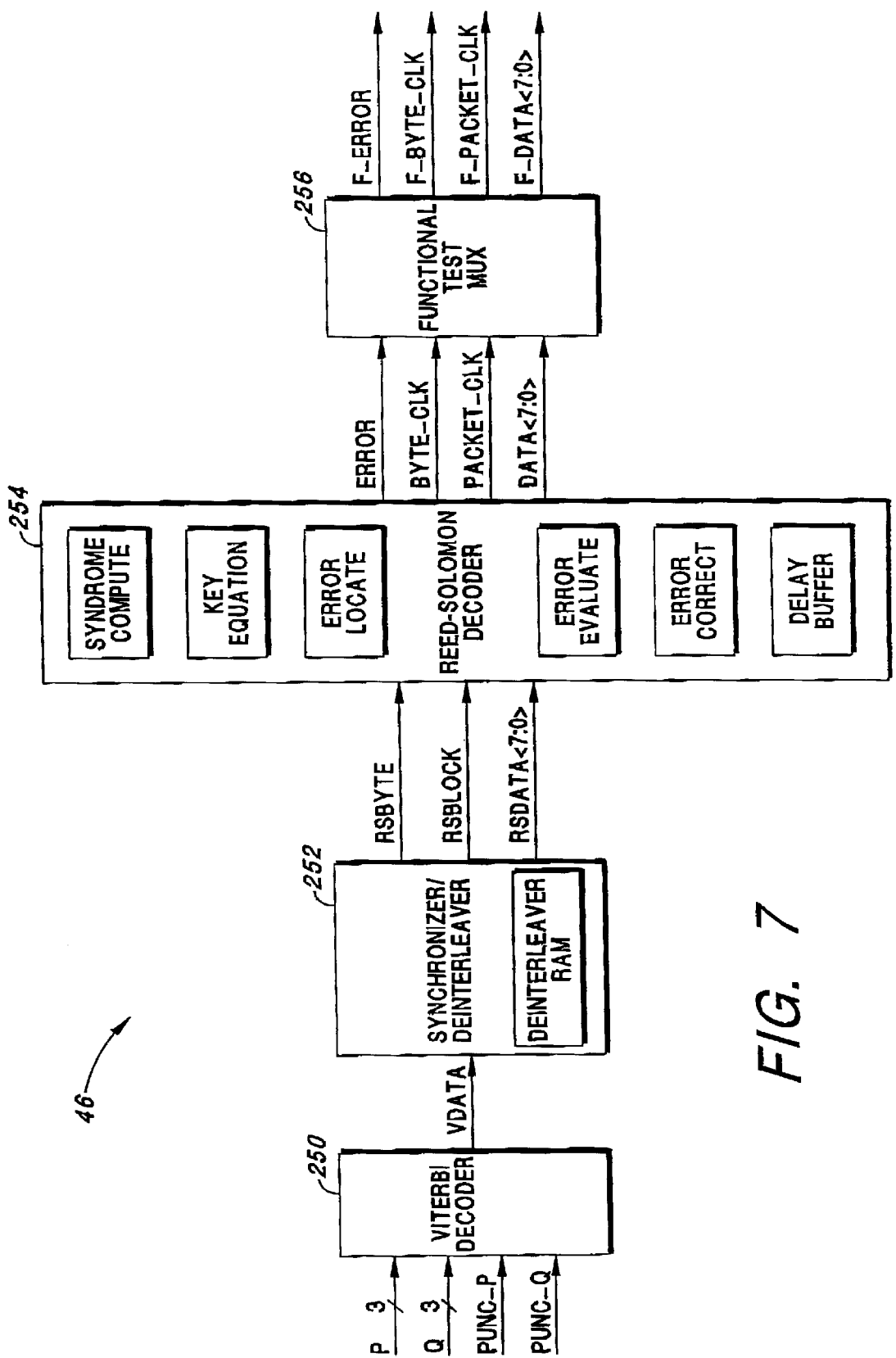
FIG. 7 is a detailed block diagram of the FEC decoder shown in FIG. 2.

FIG. 7 is a block diagram of the forward error correcting (FEC) decoder 46. The FEC decoder 46 performs the following functions: Viterbi (K=7) decoding at either R2/3 or R6/7 with a 3-bit soft decision data format; Ramsey type 2 deinterleaving; block synchronization to identify Reed-Solomon block boundaries; Reed-Solomon error detection and correction on 146-byte data blocks; and identification and flagging of blocks containing uncorrectable bit errors.

The FEC decoder 46 includes a Viterbi decoder 250, a synchronizer/deinterleaver 256, a Reed-Solomon decoder 254, and a functional test matrix multiplexer 256. The inputs to the Viterbi decoder 250 are received from the FEC interface circuit 194 of the demodulator 44.

The functional test matrix 256 permits test data to be injected into the data stream at the output of the decoder 46 under control of the microprocessor 62.

Referring to FIG. 1, the transport IC 48 includes a channel demultiplexer 80, a decryption circuit 82, and an access card interface 84. The transport IC 48 can act as a central distribution point for received data and can separate service requests from the incoming data stream. The main function of the transport IC is to provide decoding and distribution of received data to the appropriate destination device, whether it is the microprocessor 62, the A/V decoder 86, the DVCR interface 74, or high speed port 76. The transport IC 48 can perform the following functions: selection and routing of service request data received from the satellite or from the DVCR interface 74; service decryption; arbitration for the system DERAM 58; microprocessor interface to other receiver components; reference clock synchronization; error recovery of the MPEG data stream; packet error detection; and MPEG bus control.

Through the channel demultiplexer 80, the transport IC 48 may receive packetized data from the FEC decoder 46 or the DVCR interface 74. This interface includes a digital data stream, a bit clock, a packet clock and a packet error signal. The transport IC 48 can perform service decoding on each incoming packet. To accomplish this, the first two bytes of each incoming packet can be examined by the transport IC 48 to determine if the packet contains a service request, such as a CAP, or audio-visual data.

The decryption circuit 82 permits satellite receiver 24 to receive encrypted data packets. A prefix bit included in each packet can be used to determine whether data within the packet is encrypted. If decryption is indicated, the decryption circuit 82 can employ an industry standard data encryption standard (DES) scheme to decrypt the incoming packet.

The access card interface 84 provides a physical and link layer interface to the access card reader 60. The access card reader 60 can be a commercially available smartcard reader that functions in accordance with ISO 7816-2. The card reader 60 is capable of transferring data between the receiver and an external memory, such as a smartcard 63.

The system DRAM 58 can a multi-use resource that provides rate buffer control, data storage, control word storage and scratch pad memory for the microprocessor 62.

Figure 8:
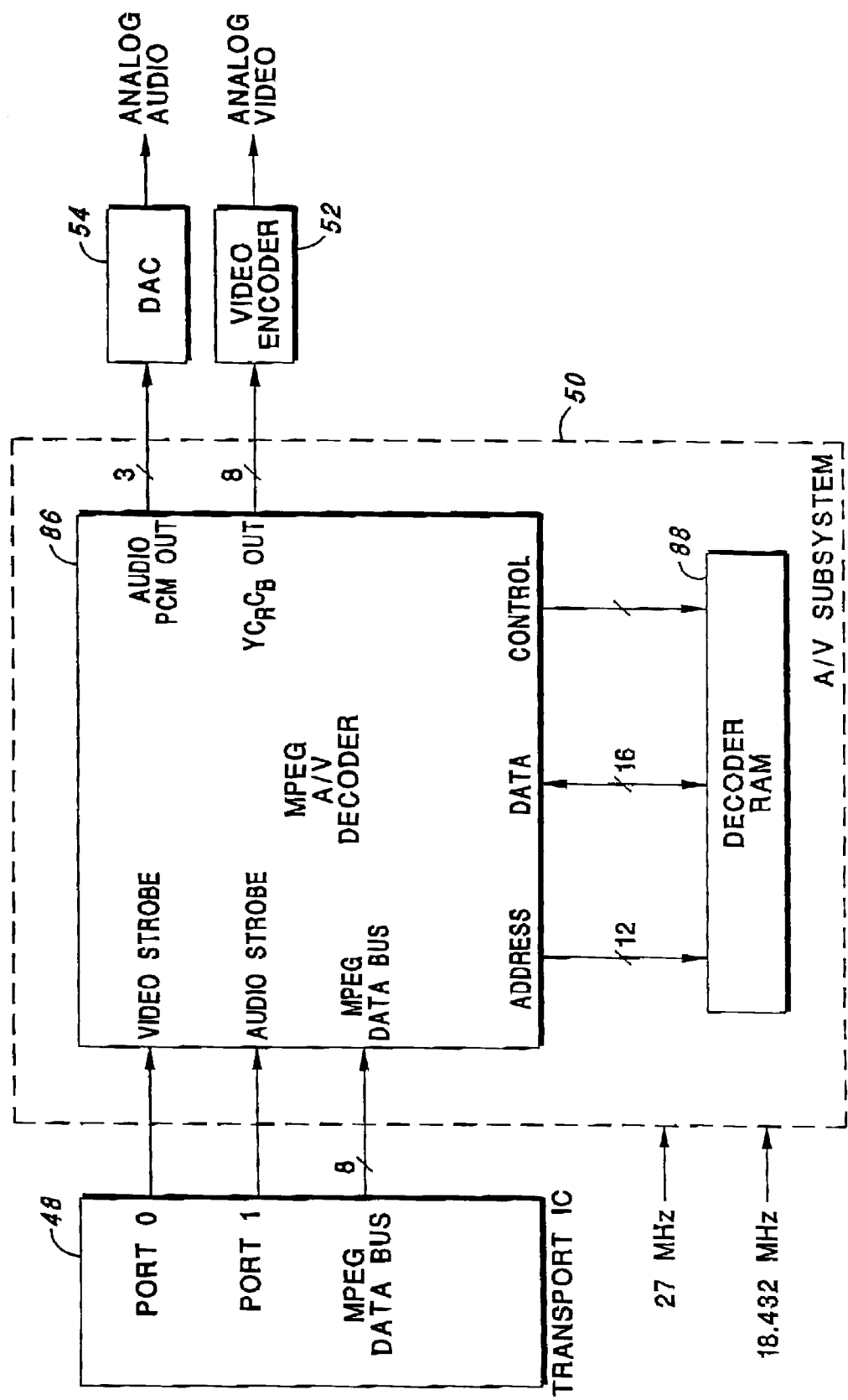
FIG. 8 is a detailed block diagram of the A/V subsystem shown in FIG. 2.

Turning now to FIG. 8, there is illustrated a block diagram of the A/V subsystem 50. The A/V subsystem 50 can decode incoming MPEG audio and video streams to deliver full bandwidth digital audio and video signals. The MPEG A/V decoder 86 can be based upon commercially available MPEG microcircuits, such as Part No. SGS352OA, from Silicon Graphic Systems, Inc. Also included in the A/V subsystem 50 is a decoder RAM 88. The decoder RAM 88 can be used for audio and video buffering.

The A/V subsystem 50 functions as follows: an incoming bit stream containing audio and video data as received from the transport IC 48 on the MPEG data bus. Audio PCM data is output to a digital-to-analog converter (DAC) 54, which converts the digitized audio into an analog signal suitable for driving an audio amplifier. Decompressed video output is provided to the video encoder 52. The outputs to the A/V subsystem 50 are provided to the output drivers 56.

Figure 9:
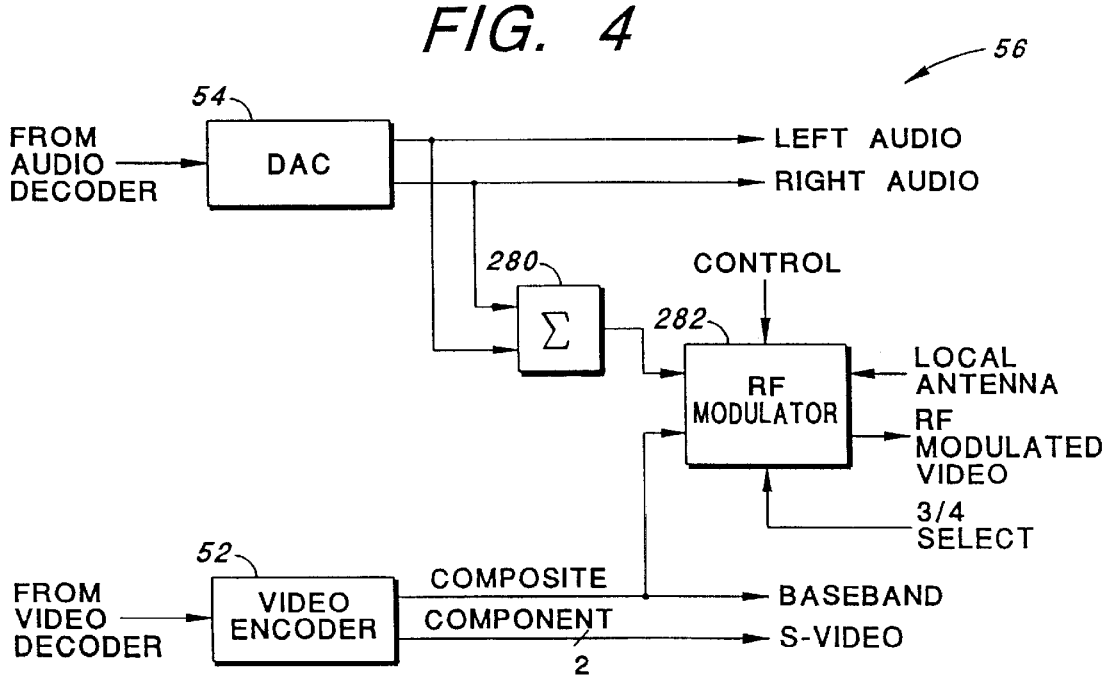
FIG. 9 is a detailed block diagram of the output drivers shown in FIG. 2.

The details of the output driver circuit 56 are shown in FIG. 9. The driver circuit 56 includes an analog summation circuit 280 for summing left and right audio channels from the DAC 54. The summing circuit 280 provides a monaural audio input to the RF modulator 282. The video encoder 52 can provide composite NTSC video signal as output, which is received by the RF modulator 282. In addition, the video encoder 52 can also output video component signals (luminance and chrominance). The two component signals can be routed to an S-video connector, for use by subscriber.

Alternatively, a video encoder can provide PAL compatible outputs.

The RF modulator 282 modulates the incoming video and monaural audio signals according to the 3/4 channel select input. The RF modulated video output can then be provided to a conventional television receiver.

Figure 10:
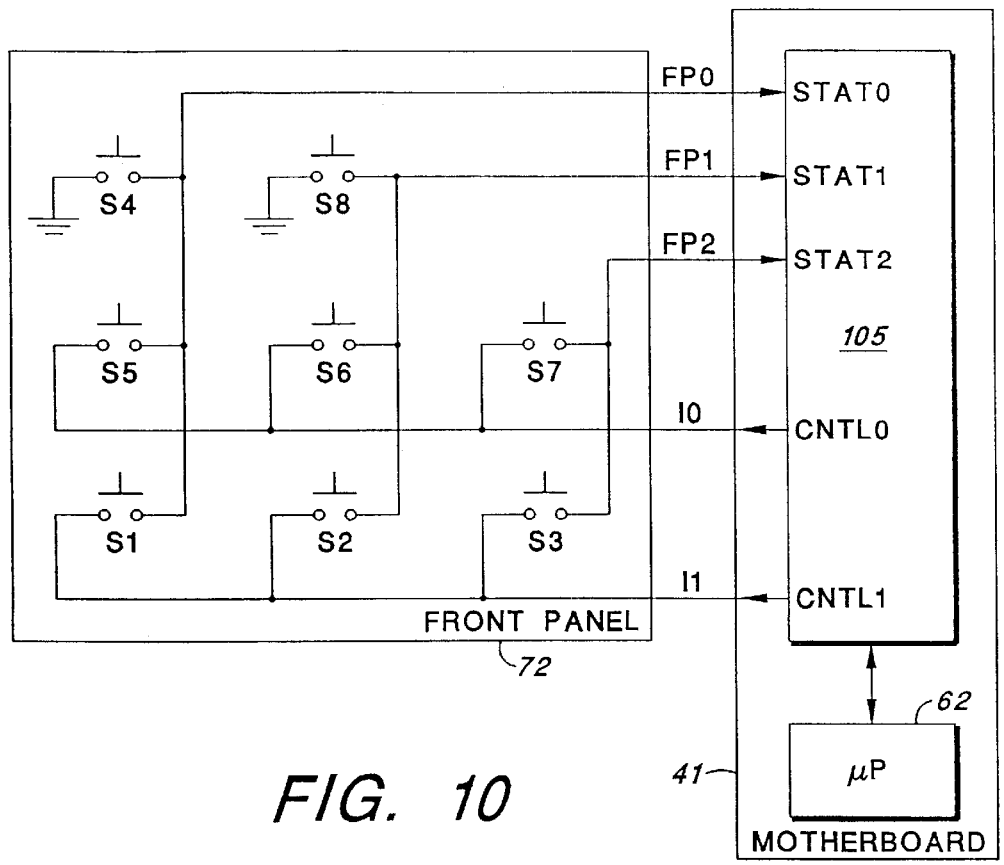
FIG. 10 is a detailed block diagram of the front panel shown, in FIG. 2.

FIG. 10 illustrates a functional diagram of the front panel 72. The front panel 72 can include eight switches (S1–S8). There is one status line (FP0–FP2) for each group, and each status line is monitored by the microprocessor 62 via a port (STAT0–STAT2) in the front panel interface 105. The microprocessor 62 can poll these lines on a regular basis. Two control signals (I0, I1) can be generated by the interface 105 under the control of the microprocessor 62. By regularly generating predetermined control signals and polling the status lines at regular intervals, the microprocessor 62 can detect "button pushes", i.e., depressed switches. In this manner, the microprocessor 62 can detect entry of a predetermined key sequence by a subscriber. Accordingly, a subscriber can use the front panel 72 to initiate the diagnostic process that ultimately leads to a diagnostic report being transferred to a remote service center via the modem 66.

Figure 11:
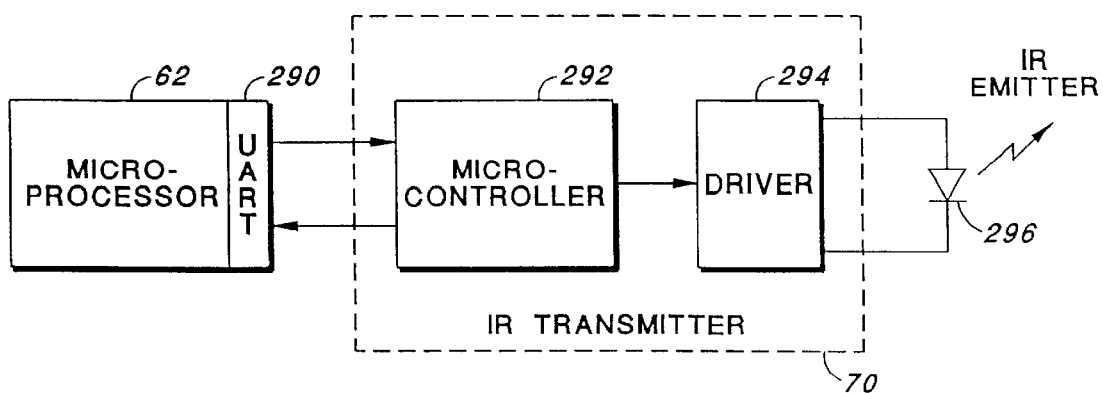
FIG. 11 is a detailed block diagram of the IR transmitter shown in FIG. 2.

FIG. 11 illustrates a detailed block diagram of the IR transmitter 70. The primary function of the IR transmitter 70 is to manage an external IR emitter 296 such as a light emitting diode (LED) and allow the satellite receiver 24 to control external devices, such as VCRs.

The IR transmitter can include a microcontroller 292 and a driver 294. The microcontroller 292 can be any conventional microcontroller or microprocessor, and can also include internal ROM and/or RAM. The microcontroller 292 can communicate with the microprocessor 62 using a universal asynchronous receiver/transmitter (UART) interface 290.

To control external devices, the microprocessor 62 can send predetermined codes that specify particular manufactures and model numbers, as well as the desired action required (record, stop, play, or the like). The microcontroller 292 can generate a digital control stream for the IR emitter 296 based on these commands. The driver 294 converts the digital control stream into an analog signal suitable for driving the emitter 296. The microcontroller 292 can also include status words stored in either internal registers or RAM. These status words can be accessed by the microprocessor 62 during diagnostic reporting to assess the condition and configuration of the IR transmitter 70.

Referring to FIG. 2, the DVCR interface 74 can include circuitry to provide an interface between the satellite receiver 24 and a subscriber-provided digital recording and playback device, such as a digital VCR (DVCR). The protocol used by the DVCR interface 74 can be based on the IEEE 1394 standard for transferring digital audio/video data. The DVCR interface 74 can also include a computer readable memory for storing configuration and status information. The memory can be accessed by the microprocessor 62 during a diagnostic reporting session to assess the condition of the DVCR interface 74.

After the diagnostic information has been transferred to the service center and analyzed, the service center can send commands to the satellite receiver 24 to mitigate reported problems. The commands can include, but are not limited to: resetting the satellite receiver 24, resetting customer preferences, resetting customer preferences to factory defaults, changing service center phone number, or the like.

The commands can be digital words issued by either the service provider or the service center. If the commands are issued by the service provider, they are transmitted to the satellite receiver 24 via the satellite RF link using special CAPs. If the commands are issued by the technical service center, they are transferred via the modems and telephone network.

The special CAP can include one or more command words for triggering appropriate actions within the receiver 24. Alternatively, the special CAP can include a command which would cause the receiver to connect to the technical service center via the modem so that further commands for reconfiguring the receiver 24 can be received via the telephone network.

In sum, there has been described a system and method for reporting satellite receiver diagnostic information to a service center. Because the exemplary embodiment of the system as herein described relies on a conventional modem for reporting diagnostic information, service technicians can remotely trouble-shoot and re-configure problematic satellite receivers.

Obviously, many modifications and variations of the present invention are possible in light of the above teachings. Thus, it is to be understood that, within the scope of the appended claims, the invention may be practiced otherwise than as specifically described above.

What is claimed is:

1. A satellite receiver, comprising:
   an interface for receiving a request for diagnostic information;
   a controller, operatively coupled to the interface, for accessing the diagnostic information in response to the request; and
   a modem, operatively coupled to the controller, for transferring the diagnostic information over a telephone network,
   wherein the interface includes a user interface permitting a customer to manually enter the request for the diagnostic information.

2. The satellite receiver of claim 1, wherein the interface includes a radio frequency (RF) receiver for receiving the request.

3. The satellite receiver of claim 2, wherein the request is included in an RF transmission from a satellite.

4. The satellite receiver of claim 1, wherein the user interface includes means for generating a graphical user interface (GUI) having a software button permitting the customer to generate the request.

5. The satellite receiver of claim 1, wherein the diagnostic information includes information selected from the group consisting of preference settings, configuration information, status information, and operational information.

6. The satellite receiver of claim 1, wherein the satellite receiver is responsive to a command generated by a service center station in response to the diagnostic information.

7. The satellite receiver of claim 1, further comprising an external memory interface, operatively coupled to the controller, for communicating with an external memory.

8. A satellite receiver comprising:
   an interface for receiving a request for diagnostic information;
   a controller, operatively coupled to the interface, for accessing the diagnostic information in response to the request;
   a modem, operatively coupled to the controller, for transferring the diagnostic information over a telephone network; and
   means for causing the modem to transfer startup information over the telephone network in response to initial activation of the satellite receiver.

9. A satellite receiver, comprising:
   an interface for receiving a request for diagnostic information;
   a controller, operatively coupled to the interface, for accessing the diagnostic information in response to the request;
   a modem, operatively coupled to the controller, for transferring the diagnostic information over a telephone network; and
   an external memory interface, operatively coupled to the controller, for communicating with an external memory,
   wherein the diagnostic information includes information selected from the group consisting of information regarding the external memory interface and information regarding the external memory.

10. A satellite receiver, comprising:
    means for receiving a request for diagnostic information;
    means for accessing the diagnostic information in response to the request; and
    means for transferring the diagnostic information over a telephone network,
    wherein the receiving means includes means for manually entering the request for the diagnostic information at the satellite receiver.

11. The satellite receiver of claim 10, wherein the receiving means includes means for receiving the request from a remote location.

12. In a communication system, a method of obtaining diagnostic information from a satellite receiver, comprising:
    providing a request for the diagnostic information to the satellite receiver;
    accessing the diagnostic information in response to the request;
    transferring the diagnostic information over a telephone network to a remote location; and
    permitting a customer to manually enter the request for the diagnostic information.

13. The method of claim 12, for resolving problems with the satellite receiver, further comprising:
    receiving the diagnostic information at the remote location;
    analyzing the diagnostic information to generate a command;
    transferring the command to the satellite receiver; and
    configuring the satellite receiver based on the command.

14. A communication system, comprising:
    a service provider station;
    a satellite receiver in communication with a telephone network;
    an orbiting satellite for providing a radio frequency (RF) communication link between the service provider station and the satellite receiver; and
    a service center station capable of communicating with the satellite receiver over the telephone network;
    the satellite receiver being configured to transfer diagnostic information to the service center station over the telephone network in response to a status request,
    wherein the satellite receiver includes a user interface permitting a customer to manually enter the request for the diagnostic information.

15. The communication system of claim 14, wherein the satellite receiver includes a modem for communicating over the telephone network.

16. The communication system of claim 14, wherein the service provider transmits data broadcasts.

17. A computer-usable medium storing a software program for directing a programmable satellite receiver having a modem to transfer, via the modem, receiver diagnostic information to a predetermined remote station in response to a status request and for permitting a customer to manually enter the request for the diagnostic information.

18. The computer-usable medium of claim 17, wherein the software program includes a routine for gathering the receiver diagnostic information.

19. The computer-usable medium of claim 17, wherein the software program includes a routine for receiving the status request over a radio frequency (RF) communication link.

20. A satellite receiver, comprising:
    means for receiving a request for diagnostic information;
    means for accessing the diagnostic information in response to the request;
    means for transferring the diagnostic information over a telephone network; and means for causing the transferring means to transfer startup information over the telephone network in response to initial activation of the satellite receiver.

21. A satellite receiver, comprising:

means for receiving a request for diagnostic information;

means for accessing the diagnostic information in response to the request;

means for transferring the diagnostic information over a telephone network;

means for communicating with an external memory, wherein the diagnostic information includes information selected from the group consisting of information regarding the communicating means and information regarding the external memory.

22. In a communication system, a method of obtaining diagnostic information from a satellite receiver, comprising:

providing a request for the diagnostic information to the satellite receiver;

accessing the diagnostic information in response to the request;

transferring the diagnostic information over a telephone network to a remote location; and causing the modem to transfer startup information over the telephone network in response to initial activation of the satellite receiver.

23. In a communication system, a method of obtaining diagnostic information from a satellite receiver, comprising:

providing a request for the diagnostic information to the satellite receiver;

accessing the diagnostic information in response to the request;

transferring the diagnostic information over a telephone network to a remote location;

communicating with an external memory via an external memory interface; and including in the diagnostic information, information selected from the group consisting of information regarding the external memory interface and information regarding the external memory.

24. A communication system, comprising:

a service provider station;

a satellite receiver in communication with a telephone network;

an orbiting satellite for providing a radio frequency (RF) communication link between the service provider station and the satellite receiver; and a service center station capable of communicating with the satellite receiver over the telephone network, wherein the satellite receiver is configured to transfer diagnostic information to the service center station via modem over the telephone network in response to a status request, and the satellite receiver is configured to cause the modem to transfer startup information over the telephone network in response to initial activation of the satellite receiver.

25. A communication system, comprising:

a service provider station;

a satellite receiver in communication with a telephone network and including an external memory interface, operatively coupled to a controller, for communicating with an external memory;

an orbiting satellite for providing a radio frequency (RF) communication link between the service provider station and the satellite receiver; and a service center station capable of communicating with the satellite receiver over the telephone network, wherein the satellite receiver is configured to transfer diagnostic information to the service center station over the telephone network in response to a status request, and the diagnostic information includes information selected from the group consisting of information regarding the external memory interface and information regarding the external memory.

26. A computer-usable medium storing a software program for directing a programmable satellite receiver having a modem to transfer, via the modem, receiver diagnostic information to a predetermined remote station in response to a status request and for causing the modem to transfer startup information over the telephone network in response to initial activation of the satellite receiver.

27. A computer-usable medium storing a software program for directing a programmable satellite receiver having a modem to transfer, via the modem, receiver diagnostic information to a predetermined remote station in response to a status request, for communicating with an external memory via an external memory interface, and for including in the diagnostic information, information selected from the group consisting of information regarding the external memory interface and information regarding the external memory.

* * * * *